Patented Nov. 16, 1948

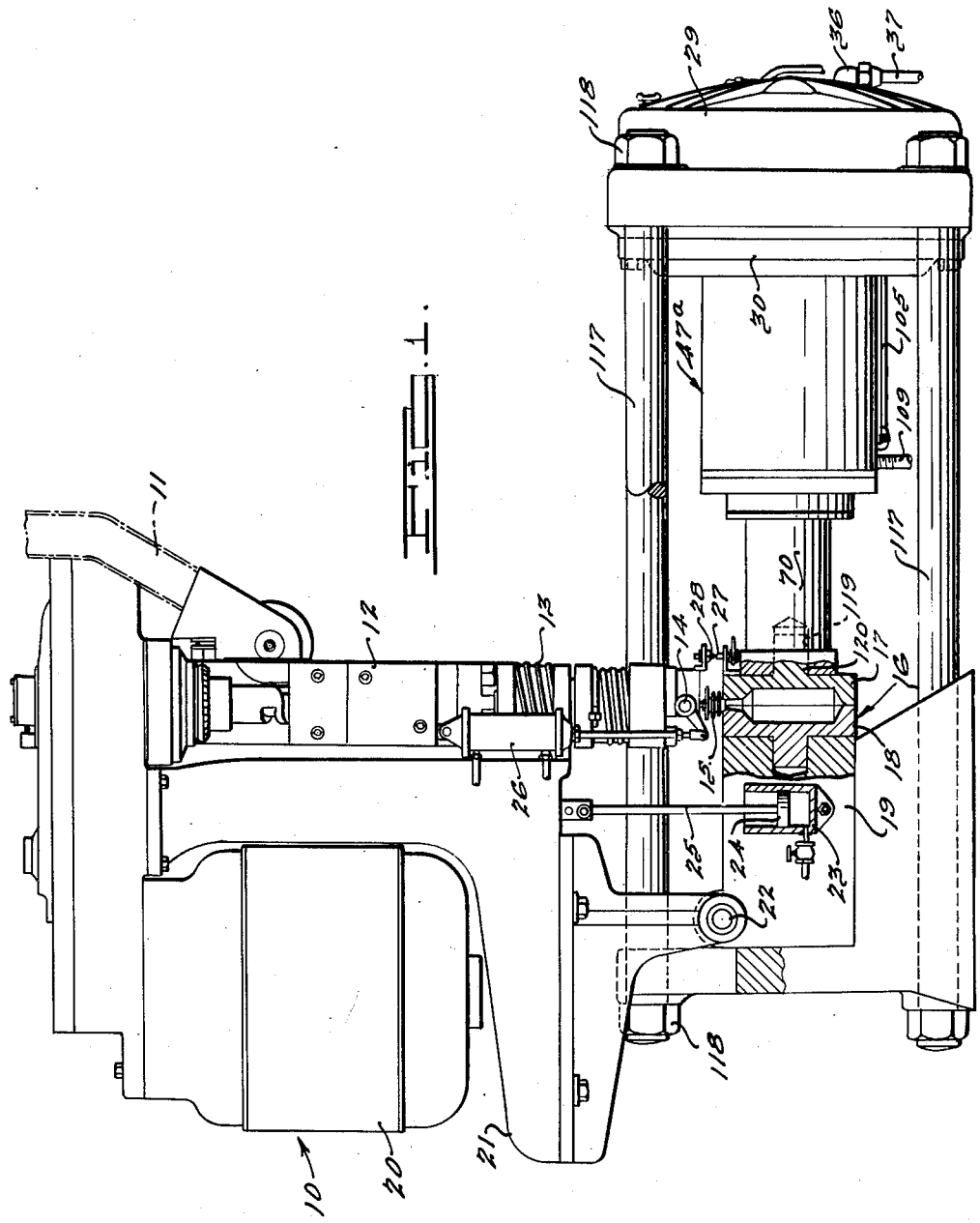

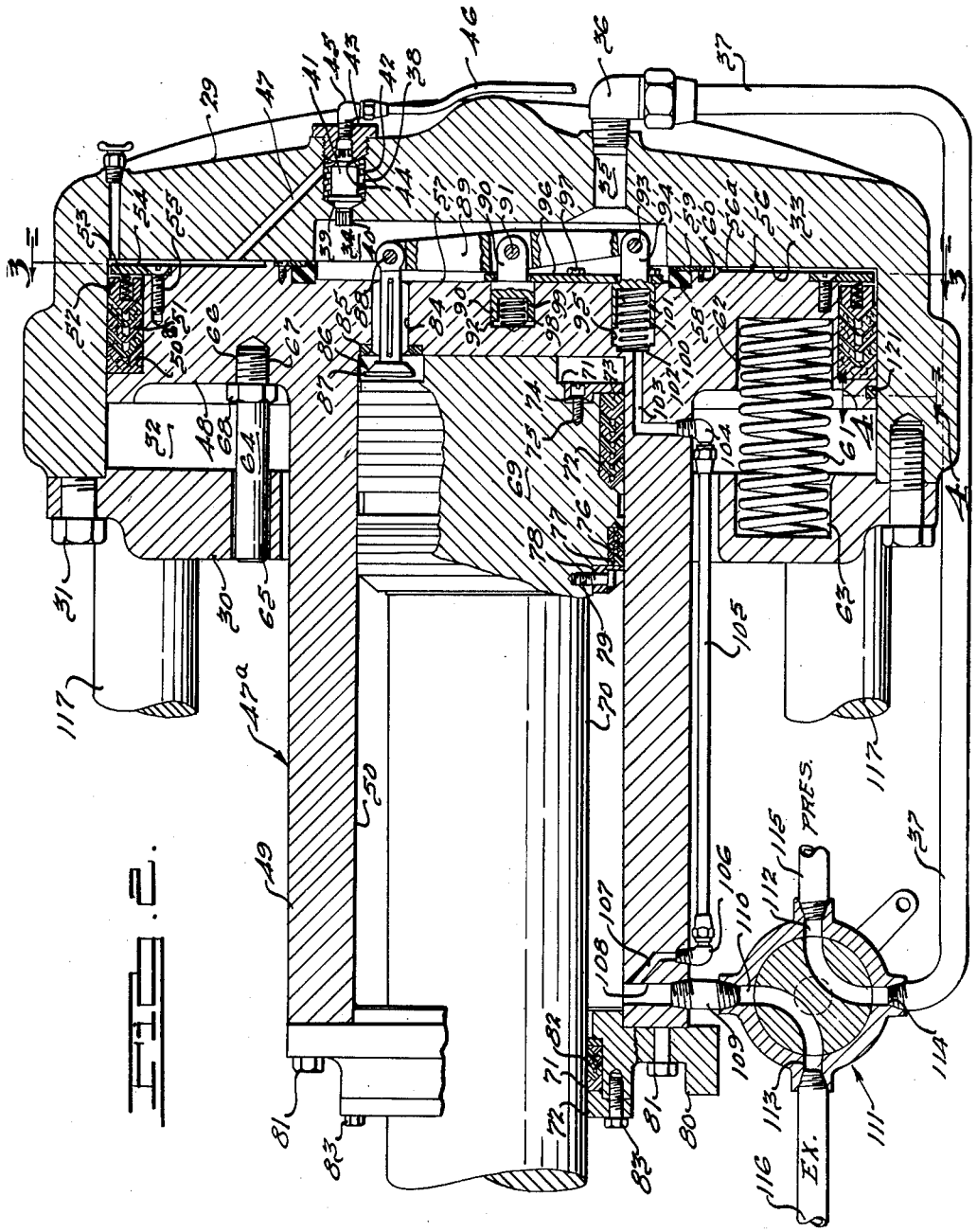

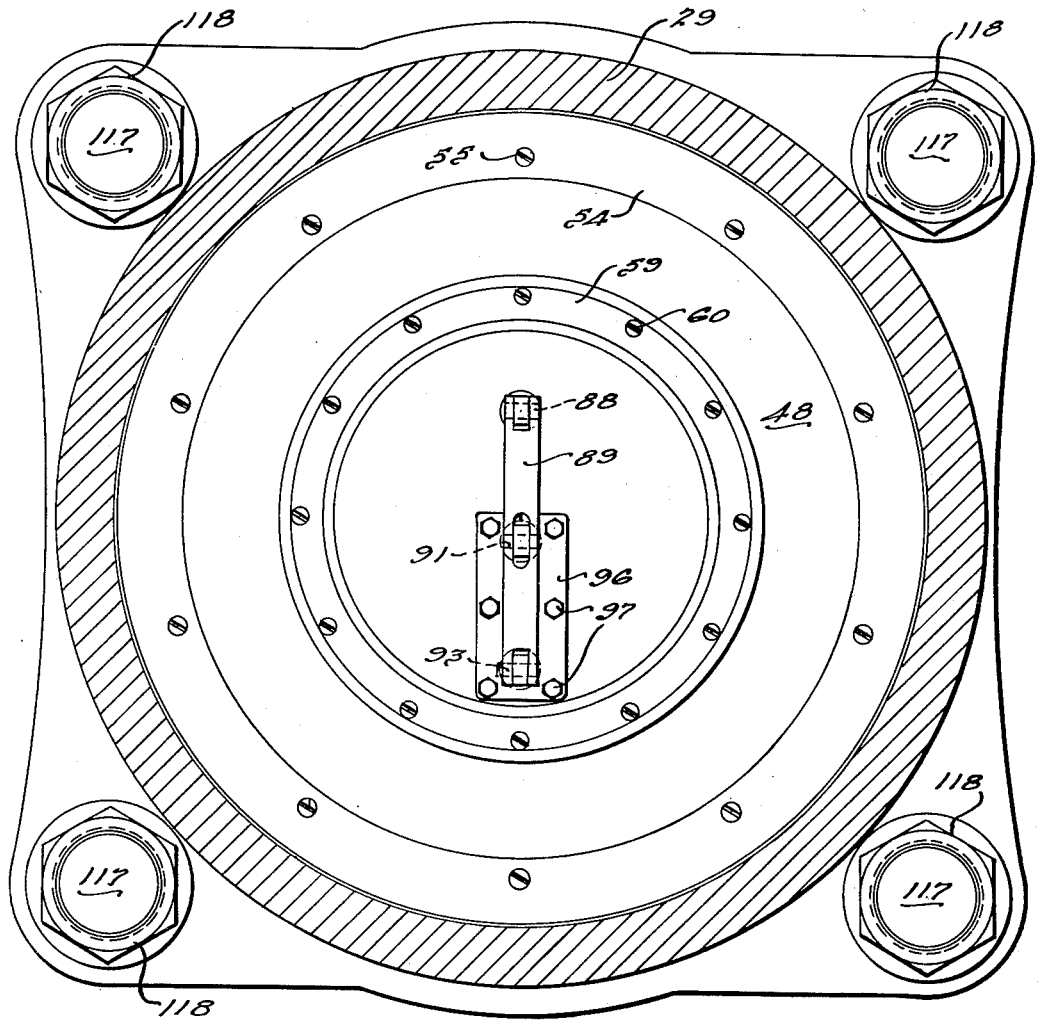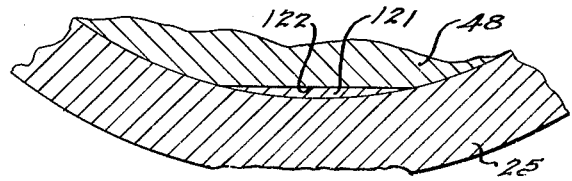

2,453,785

UNITED STATES PATENT OFFICE 2,453,785

HOLDING APPARATUS WITH PISTON THROUGH WHICH PRESSURE FLUID IS PASSED

Walter P. Cousino, Detroit, Mich., assignor to Chrysler Corporation, Highland Park, Mich., a corporation of Delaware Continuation of application Serial No. 516,194, December 30, 1943. This application October 18, 1946, Serial No. 703,959

15 Claims. (Cl. 60—54.5)

This application is a continuation of application Serial No. 516,194, filed December 30, 1943, now abandoned. This invention relates to fluid pressure means for holding parts. More specifically it relates to fluid-pressure means for moving a certain part into assembled relation with another part, and holding with force the certain part in assembled relation with the other part. The invention is applied advantageously to the holding of mold parts adapted to receive thermoplastic or thermosetting materials.

A mold for materials setting under changes in temperature and/or pressure normally comprises mating parts, one stationary, the other movable. The movable part is brought into engagement with the stationary part, is held in such engagement during injection of the aforementioned materials and setting thereof, and is moved away from the stationary part for removal of the set mass from the mold. When such materials are injected into a mold under a high pressure, there is a high pressure set up tending to force the movable mold part away from the stationary part. Thus the apparatus controlling the movable mold part should be capable of moving the movable part into place, holding the movable part in place with great force, and moving away the movable part. The present invention relates to an apparatus for doing these things, and, although the apparatus is illustrated as employed with a mold for materials of the above type injected under pressure and is of special advantage with this type of mold, it is to be understood that it may be applied to other types of molds and also to any arrangement in which a movable part is shifted into a certain position and is held in such position.

An object of the present invention is to provide means for shifting a part to a certain position and holding it with force in that position.

A further object is to provide improvement in means for controlling mold parts. Mold parts that receive material setting under changes in temperature and/or pressure and injected into the mold under pressure require considerable holding force. Moreover, at least one mold part is normally movable and so must be brought into assembled relation with the rest of the mold. All this may be accomplished by fluid-pressure means according to the present invention.

Therefore, another object is the provision of means for bringing a movable mold part to assembled relation with a stationary mold part and holding the mold parts in assembled relation during injection of material into the mold.

A still further object is to provide means for moving the movable mold part away from assembled relation with the remainder of the mold after injection of material into the mold and setting thereof. After the completion of a molding operation the object formed must be removed from the mold, and this requires the disassembling of the mold sufficient to permit removal of the object. This may be accomplished by moving away of the mold part that was originally moved into assembled relation with the remainder of the mold.

Still another object is to provide means for applying a certain intermediate total force and then a greatly increased total force without greatly increasing the unit pressure. The force required for bringing a movable mold part to assembled relation with the remainder of the mold is normally much less than the force required for holding the mold in assembled relation. Thus means of the type specified above finds use in a mold for material injected under pressure. The great increase in the total force without great increase in unit force is accomplished by shifting from a small area receiving the force to a large area.

A further object is the provision of improved valve means and valve control means for use with a force-applying system involving the use of fluid under pressure.

Another object is the provision of a plurality of pistons in a fluid-pressure arrangement for applying force. When, as in the case of the injection of materials into a mold at high pressure, a certain part must be moved into place and then held in place, it has become desirable to employ a plurality of pistons. The pistons are employed cooperatively with one another so that the fluid-pressure arrangement can easily control the assembly and holding of the parts.

Still another object is to provide fluid-pressure means for moving a part rapidly to place and using great force to hold the part in place. As applied to a mold for material injected under pressure, this permits a rapid movement of the movable mold part to assembled relation and the application to the mold of sufficient force to hold it together. Thus the total time required for a molding operation including removal of a molded object and insertion of new material is not great.

A further object in this same connection is to make the change from quick movement of the part into place to application of great holding force automatically carried out. This is accomplished by means responsive to an increase in fluid pressure.

Other objects will appear from the disclosure.

In the drawings,

Fig. 1 is a side elevational view partially in section, of an apparatus employing the novel control means of the present invention;

Fig. 2 is a sectional view through the novel control means;

Fig. 3 is a sectional view taken on the line 3—3 of Fig. 2; and

Fig. 4 is a sectional view taken on the line 4—4 of Fig. 2.

The reference character 10 designates an apparatus for setting materials hardenable under changes in temperature and/or pressure. These materials may be metals, plastics of the thermoplastic or thermosetting type, or vulcanizable materials such as rubber. Briefly, this apparatus comprises a feeder 11 for materials, a section 12 housing a feed screw device not shown, and heating coils 13. Below the portion of the apparatus at which the heating coils 13 are located are a control valve 14 and an injection nozzle 15. Injection nozzle 15 engages a mold 16 comprising a movable mold part 17 and a stationary mold part 18. Stationary mold part 18 is carried in a bed 19. The apparatus described including the feeder 11 and feed screw 12 is driven by an electric motor 20. Various elements are carried by framework 21 pivoted at 22 on the bed 19. A hydraulic cylinder 23, a piston 24 and a connecting rod 25 are provided for raising the apparatus about the pivot 22. Valve 14 is under control of a piston, not shown, mounted within a cylinder 26. Electrical contact elements 27 and 28 are connected respectively to the injection nozzle 15 and to the mold 16. Heat may be supplied to the mold 16 if desired.

Operation of the above apparatus is briefly as follows: Material received from the feeder 11 is fed through the section 12 by the feed screw and through the section mounting the heating coils 13 to the injection nozzle 15. The heating coils 13 will have heated the material sufficiently so that it may be injected by the nozzle 15 in plastic condition into the mold 16. The apparatus feeds material under pressure into the mold 16 until finally the nozzle 15 is raised from the mold 16.

At this time the contact element 28 moves away from the contact element 27 and through means, not shown, discontinues operation of the motor and actuates the hydraulic cylinder 26 and contained piston to close the valve 14 to prevent the further feeding of material. The cylinder 23 and piston 24 may be operated after a suitable curing period to raise the entire apparatus about the pivot 22.

With reference to Fig. 2, a housing 29 has secured to it a flange 30 by screws 31. Housing 29 and flange 30 define a chamber 32 of relatively large area. Formed beyond an end 33 of the chamber 32 is a chamber 34 of small area and small depth. A passage 35 extends through the housing 29 from the chamber 34 and carries at its outer end in threaded engagement a fitting 36 to which is connected a conduit 37. The end of the housing 29 has a bore 38 therein provided at its inner end with a valve seat 39, and a small passage 40 extending from the valve seat 39. A valve member 41 is seated on the valve seat 39 in the position shown in Fig. 2 and is held in this position by a coil spring 42 positioned in the bore 38 and retained therein by a fitting 43 threaded into the bore 38. The fitting 43 has a valve seat 44 against which valve 41 may seat. To the fitting 43 is connected another fitting 45 connected in turn to a conduit 46. A passage 47 extends diagonally from the bore 38 to the end 33 of the chamber 32.

Mounted within the housing 29 in the chamber 32 is a piston 47ᵃ comprising essentially a flange portion 48 and an elongated cylindrical portion 49 and having a chamber 50 therein. The flange portion 48 of the piston 47ᵃ is cut away at 50ᵃ and provided at this point with packing members 51 which seal the flange portion 48 against the cylindrical wall of the chamber 32. The packing elements 51 are retained and held under pressure by a ring 52, springs 53, and a retaining member 54 secured to the flange portion 48 by screws 55. The flange portion 48 of the piston 47ᵃ has a right hand face 56 as viewed in Fig. 2, provided at its outer portions with a surface 56ᵃ set back very slightly and at a central portion with a surface 57 set back appreciably. Intermediate these portions 56 and 57 there is provided a seal 58 retained by a ring 59 secured to the flange portion 48 by screws 60. As shown in Fig. 2, the seal 58 is adapted to engage the inner portion of the end 33 of the chamber 32 in sealing relation. Springs 61, of which only one is shown, act between the flange 30 and the flange portion 48 of the piston 47ᵃ to urge the piston 47 to the extreme right position of Fig. 2. Each spring 61 is seated at one end in a recess 62 in the flange portion 48 and at the other end in a recess 63 in the flange 30. Members 64, of which only one is shown, guide the piston 47ᵃ because they are fitted in openings 65 in the flange 30, of which only one is shown. Each member 64 has a threaded end 66 engaging a threaded opening 67 in the flange portion 48 of the piston 47ᵃ and a lock nut 68 serves to prevent unscrewing of each member 64 from the flange portion 48.

Mounted in the recess 50 in the piston 47ᵃ is a piston 69 having a rod member 70 of large diameter integral with the piston 69 extending therefrom to the left as viewed in Fig. 2, and outwardly of the portion 49 of the piston 47ᵃ. The right end of the piston 69 is cut back to form a shoulder 71 and packing elements 72 adjacent the shoulder seal the right end of the piston 69 in the chamber 50 and are compressed for proper sealing by a part 73 and a retaining ring 74 secured to the piston 69 by screws 75, of which only one is shown. The left end of the piston 69 is sealed in the chamber 50 by packing elements 76 pressed into sealing relationship with the chamber 50 by a part 77 and a retaining ring 78 secured to the piston 69 by screws 79, of which only one is shown. To the end of the portion 49 of the piston 47ᵃ is secured a ring member 80 by screws 81. The member 80 carries packing elements 82, which seal the rod 70 and are compressed into sealing relationship with the rod 70 by a part 71 and a retaining ring 72 secured to the member 80 by screws 83.

The right end of the piston 47ᵃ has a passage 84, the left end of which is enlarged and carries a valve seat 85. A valve 86 extends in the passage 84 and is adapted to have a head portion 87 seat against the valve seat 85. At the right end of the valve 86 is pivotally connected at 88 one end of a lever 89 pivotally mounted between its ends at 91 on a fulcrum member 90 mounted in a recess 92 in the end of the piston 47ᵃ. The other end of the lever 89 is pivotally connected at 93 to a pressure responsive member 94 mounted in a recess 95 in the end of the piston 47ª. The members 91 and 94 are retained in their respective openings 92 and 95 in the piston 47ª by means of a strip 96 secured to the piston 47ª by bolts 97. A spring 98 fitting within a recess 99 in the fulcrum member 90 acts against the bottom of the recess 92 to urge the member 90 to the right against the plate 96, as viewed in Fig. 2. Similarly a spring 100 fitted within a recess 101 in the pressure responsive member 94 and in a shallow recess 102 in the end of the recess 95 urges the pressure responsive member 94 to the right against the strip 96. A passage 103 in the piston 47ª extends from the end of the recess 95 to the side of the portion 49 and a fitting 104 is secured at that point in threaded engagement. A conduit 105 connects the fitting 104 and a fitting 106 in threaded engagement with another passage 107 in the portion 49 of the piston 47ª leading to a passage 108 extending from the outside of the portion 49 to the chamber 50 within the piston 47ª. A pipe section 109 is threaded into one end of the conduit 108 and also into one outlet 110 of a four-way valve 111. The valve 111 has three other outlets 112, 113 and 114 to which are respectively connected by threaded engagement a conduit 115 leading from a source of pressure such as a pump, a conduit 116 serving as an exhaust, and the conduit 37. Elongated stay-bolts 117 secured by nuts 118 hold in spaced relation and secure the housing 29 to the bed 19. The end of the enlarged rod 70 opposite that to which the piston 69 is secured, carries a recess 119 into which a reduced portion 120 on the movable mold part 17 fits.

For operation of the novel means of the present invention, the four-way valve 111 is in the position shown in Fig. 2. Thus fluid under pressure passes from the conduit 115 through the valve 111, the conduit 37, the fitting 36, and the passage 35 in the housing 29 into the small chamber 34 in the housing 29. Fluid under pressure also passes from the chamber 34 through the passage 84 into the portion of the chamber 50 within the piston 47ª between the shoulder 71 and the right end of the chamber 50. The fluid under pressure so admitted acts against the right end of the piston 69 to move it to the left, as viewed in Fig. 2. The movable mold part 17 is also moved to the left, as viewed in Fig. 1, and into assembled relation with the stationary mold part 18, as shown in Fig. 1. Continued movement of the piston 69 to the left is now stopped by arrival of the movable mold part 17 at the stationary mold part 18. The pressure in the chamber 50 to the right of the piston 69, the passage 84, and the small chamber 34 in the housing 29 now increases. When this pressure reaches a certain point, for example, 100 lbs. per square inch, it is sufficient to cause the pressure responsive member 94 to move to the left, as viewed in Fig. 2, against the action of the spring 100 arranged to resist compression up to this point.

When the pressure responsive member 94 moves to the left it acts through the lever 89 to move the valve 86 to the right and the head 87 into engagement with the valve seat 85. The seating of the valve head 87 against the valve seat 85 locks fluid under pressure within the chamber 50 to the right of the piston 69. A continued increase of pressure in the chamber 34 to a point, for example 125 lbs., causes the valve 41 to be raised from the valve seat 39 and to move into engagement with the seat 44 in the fitting 43. Thus the fluid under pressure passes through the opening 38 and the passage 47 to the outer portion 56ª of the end surface 56. A continued increase in pressure causes the piston 47ª to move somewhat to the left, as viewed in Fig. 2, compressing the springs 61 which have resisted compression up to this point. This acts by virtue of compression of the fluid under pressure to the right of the piston 69 within the chamber 50 to exert a very great force upon the piston 69, the rod 70, and the movable mold part 17. Thus the movable mold 17 is very firmly held against the stationary mold part 18. Now the molding operation is begun and thermoplastic or thermosetting material fed through the molding apparatus and by the injection valve 15 under pressure into the mold 16. The pressure of injection is very great and the force applied to the movable mold part 17 to hold it against the stationary mold part 18 must consequently be very great. When the mold 18 has been completely filled and the material injected therein has set satisfactorily, the four-way valve 111 is rotated so that conduit 37 is connected to exhaust line 116 and pressure line 115 is connected to conduit section 109. Thus pressure is released against the flange portion 48 of the piston 47ª. Fluid under pressure is then supplied through the passage 108 into the portion of the chamber 50 within the piston 47ª to the left of the piston 69 and the piston 69 is urged to the right toward the position of Fig. 2. At the same time fluid under pressure passes from the passage 108, through the passage 107, the fitting 106, the conduit 105, the fitting 104, the passage 103 and into the recess 101 in the pressure responsive member 94, causing it to move to the right. This movement of the pressure responsive member 94 to the right acts through the lever 89 to move the valve 86 to the left and to raise the valve head 87 from the valve seat 85. Thus fluid in the chamber 50 to the right of the piston 69 may escape through the passage 84 into the chamber 34 and thence through the passage 35, the fitting 36, the conduit 37, and the valve 111 into the exhaust line 116. After the movable mold part 17 has been moved out of contact with the stationary mold part 18 the molded article is removed from the mold 16 and a new molding operation is ready to begin.

As the piston 47ª moves back to the position of Fig. 2 under the action of the springs 61 upon release of the fluid pressure against the end of the piston 47ª any excess fluid and air that may be entrapped between the end 33 of the chamber 32 and the portion 56ª of the piston flange 48 passes out through the passage 47, the fittings 43 and 45, and the conduit 46, since the valve 41 has moved out of engagement with the seat 44 and back into engagement with the seat 39.

Fig. 4 shows a bronze support shoe 121 fitted into a groove 122 in the bottom side of the piston flange portion 48 and serves as a bearing support for the piston against the cylindrical wall of the chamber 32 during movement of the piston.

Several significant items concerning the invention will now be mentioned. The fluid under pressure employed is oil which normally entraps an appreciable amount of air. Thus when the fluid under pressure or oil is locked within the piston 47ª in the chamber 50 to the right of the piston 69, it is compressible in volume by virtue of the entrapped air to a greater extent than pure oil would be. Thus the piston 47ª may actually move to the left and compress the volume at the right end of the piston 69 in the chamber 50. As a matter of fact, the compression of volume may be quite appreciable and be so great as to allow a rather appreciable movement of the piston 47ᵃ to the left. This in turn allows a rather appreciable volume for fluid under pressure between the end of the chamber 33 and the outer portion 56ᵃ of the flange portion 48 of the piston 47ᵃ. This rather appreciable volume raises the volume requirement of the pumping apparatus supplying the fluid under pressure. For reducing this volume as much as possible, the fulcrum member 91 and its associated spring 98 have been provided. They function as follows: When the pressure responsive member 94 has moved to the bottom of the recess 95 upon raising of the pressure of the fluid in the chamber 34 to the predetermined elevated pressure, for example 100 lbs., and has caused the valve head 87 to become seated against the valve seat 85, the head 87 is not so tightly seated as to prevent leakage between it and the seat 85 for the pivot 90 of the lever 89 may move somewhat to the left against the action of the spring 98 to the limit of movement allowed by engagement of the bottom of the recess 92 with the fulcrum member 90. Thus even though the valve head 87 is apparently seated it may be actually unseated slightly sufficiently to permit leakage. As the pressure is increased in the chamber 34 beyond the 100 lbs. required for movement of the pressure responsive member 94 to the left, leakage is occurring and the pressure of the fluid trapped in the chamber 50 to the right of the piston 69 is greater because of the raising of this fluid to a higher pressure. Since the movement of the piston 48 is reduced, the volume of fluid between the end 33 of the chamber 32 in the housing 29 and the outer portion 56ᵃ of the piston 47ᵃ is reduced and likewise the total required capacity of the pumping apparatus supplying the fluid under pressure.

The valve 86 finally closes when the pressure rises sufficiently above 100 lbs. to cause the pressure-responsive member 94 to move to the left far enough to insure closing of the valve 86 in spite of movement to the left of the yieldably mounted fulcrum 90.

It might appear that if an insufficient compression of the oil and its entrapped air in the chamber 50 to the right of the piston 69 is obtained at a mere 100 lbs. pressure at which point the pressure responsive member 94 is caused to move to the left seating the valve head 87 upon the seat 85, the seating of the valve head 87 should be made to occur at a higher pressure. However, it is desirable to have an appreciable difference between the pressure at which the pressure responsive member 94 causes the closing of the valve head 87 and the pressure at which the raising of the valve 41 from the seat 39 causes admission of the fluid under pressure to the outer portion 56ᵃ of the piston flange 48. If these pressures were too nearly equal, the fluid under pressure might reach the outer portion 56ᵃ before the valve 86 was closed and thus there would be too great a movement of the piston 47ᵃ to the left with the consequent requirement for too great a capacity of pumping apparatus due to increase of space for fluid under pressure. Therefore, it is necessary to have the apparatus work in such a way that the valve 86 is practically closed and permitting leakage for greater compression at a certain pressure and the valve 41 is opened at a considerably greater pressure for admission of fluid to the total area of the end 56 of the piston flange 48. This is accomplished through the use of a movable fulcrum member 90, movable against the action of the spring 98.

A very significant feature of the invention is that during the early stages of admitting fluid under pressure into the chamber 34 and the chamber 50 to the right of the piston 69 and after seating or partially seating of the valve head 87 on the seat 85 due to movement of the pressure responsive member 94 to the left and before raising of the valve 41 from the seat 39, the fluid under pressure is acting only against the small area portion 57 of the end 56 of the flange portion 48 of the piston 47ᵃ. Since the action is only against this portion of small area the total force exerted against the piston 47ᵃ is relatively small for a given unit pressure. Thereafter the fluid under pressure passes through the recess 38 and the passage 47 to the outer portion 56ᵃ of the flange portion 48 of the piston 47ᵃ and thus acts not only against the relatively small area of the portion 57 but also against the rather large area of the portion 56ᵃ. The total area now acted upon by fluid under pressure is very appreciably increased and the total force is very greatly increased for not a nearly so great increase in unit pressure. Thus the final pressure applied against the movable mold part 17 to hold it against the stationary mold part 18 is very high without there being a corresponding increase in unit pressure applied to the fluid under pressure. Thus the capacity of the pumping apparatus need not be so great.

Since there is a definite and decisive change in the total force applied, there is a moment before this time when the force required is insufficient to compress springs 61, and there is another moment after this time where there is sufficient force to compress these springs. Thus the effective force for compressing the springs is applied decisively, and there is no tendency for the springs to compress and the piston 47ᵃ to move before the valve 86 is closed.

The invention has been illustrated as applied to a mold for receiving materials setting under changes in temperature and/or pressure, injected under pressure, for because of the injection under pressure great force is required to hold the parts of the mold together. Nevertheless, it is to be understood that this use is merely illustrative, and the invention may have other uses.

Although but one specific embodiment of the invention is herein shown and described, it will be understood that various changes may be made without a departure from the spirit of the invention. The intention is to limit the invention only within the scope of the appended claims.

I claim:

1. A device for shifting a part to a certain position and for holding with force the part in the said certain position, said device comprising a housing, an outer piston shiftable to and away from a certain position with respect to the housing, the housing and outer piston being so formed as to contain a space between them for fluid under pressure and to cause a relatively small area of the outer piston to be accessible to the fluid under pressure in the said certain position of the outer piston and a relatively large area to be accessible to the fluid under pressure in other than the said certain position of the outer piston, an inner piston shiftable within the outer piston, a passage through the outer piston for admitting fluid under pressure between the pistons, means for admitting fluid under pressure between the housing and the outer piston with the outer piston in its said certain position, through the passage, and between the pistons for shifting the inner piston to move the part to its certain position, means for thereafter closing the passage through the outer piston to lock fluid between the pistons, a valve positioned at the inner end of the passage in the outer piston and being resiliently urged to an open position into the outer piston, a lever connected at one end to the valve and pivoted at a mid point on the outer piston, and a member mounted in the outer piston and resiliently urged toward the space between the housing and the outer piston and being accessible to the space so as to be moved under a predetermined elevated fluid pressure in the space between the housing and the outer piston due to arrival of the part at its certain position and thereby to act through the lever to close the valve, and means for thereafter causing fluid under pressure to act against the relatively large area of the outer piston and shift the same for applying pressure through compression of the fluid between the pistons against the inner piston to maintain the part in its certain position.

2. A device for shifting a part to a certain position and for holding with force the part in the said certain position, said device comprising a housing, a piston shiftable to and away from a certain position with respect to the housing, the housing and piston being so formed as to contain a space between them for fluid under pressure and to cause a relatively small area of the piston to be accessible to the fluid under pressure in the said certain position of the piston and a relatively large area to be accessible to the fluid under pressure in other than the said certain position of the piston, a passage through the piston for fluid under pressure, means for admitting fluid under pressure between the housing and the piston with the piston in its said certain position and through the passage in the piston to move the part to its certain position, means for thereafter closing the passage through the piston to lock fluid between the piston and the part, a valve positioned at the inner end of the passage in the piston and being resiliently urged to an open position into the piston, a lever connected at one end to the valve and pivoted at a mid point on the piston, and a member mounted in the piston and resiliently urged toward the space between the housing and the piston and being accessible to the space so as to be moved under a predetermined elevated fluid pressure in the space between the housing and the piston due to arrival of the part at its certain position and thereby to act through the lever to close the valve, and means for thereafter causing fluid under pressure to act against the relatively large area of the piston and shift the same for applying pressure through compression of the fluid between the piston and the part to maintain the part in its certain position.

3. A device for shifting a part to a certain position and for holding with force the part in the said certain position, said device comprising a housing, a first piston shiftable to and away from a certain position with respect to the housing, the housing and first piston being so formed as to contain a space between them for fluid under pressure and to cause a relatively small area of the first piston to be accessible to the fluid under pressure in the said certain position of the first piston and a relatively large area to be accessible to the fluid under pressure in other than the said certain position of the first piston, a second piston shiftable with respect to the first piston, a passage through the first piston for fluid under pressure between the pistons, means for admitting fluid under pressure between the housing and the first piston with the first piston in its said certain position and through the passage in the first piston and between the pistons for shifting the second piston to move the part to its certain position, means for thereafter closing the passage through the first piston to lock fluid between the pistons, a valve positioned at the inner end of the passage in the first piston and being resiliently urged to an open position into the first piston, a lever connected at one end to the valve and pivoted at a mid point on the first piston, and a member mounted in the first piston and resiliently urged toward the space between the housing and the first piston and being accessible to the space so as to be moved under a predetermined elevated fluid pressure in the space between the housing and the first piston due to arrival of the part at its certain position and thereby to act through the lever to close the valve, and means for thereafter causing fluid under pressure to act against the relatively large area of the first piston and shift the same for applying pressure through compression of the fluid between the pistons to maintain the part in its certain position.

4. A device for shifting a part to a certain position and for holding with force the part in the said certain position, said device comprising a housing having a first chamber of relatively large area extending from one end, a second chamber of relatively small area extending from the first chamber and a passage leading from the second chamber to the end of the first chamber, an outer piston shiftable within the first chamber to and away from a position of contact of one end with the end of the first chamber, the end of the outer piston being in the position of contact with the end of the first chamber exposed only the amount of the small area of the second chamber and in a position removed from contact exposed over its entire area, the outer piston having a chamber extending from the other end toward the one end and a passage extending through the one end, an inner piston shiftable within the chamber in the outer piston and connected with the part, means for forcing fluid under pressure into the second chamber against only the small area of the outer piston, through the passage in the outer piston, and into the chamber in the outer piston against one end of the inner piston to shift the inner piston to move the part to its certain position, a valve positioned at the passage in the outer piston and being normally open, means responsive to a predetermined elevated pressure due to arrival of the part at its certain position for closing the aforesaid valve to lock fluid in the chamber in the outer piston, said means comprising a lever pivotally mounted between its ends on the end of the outer piston and connected at one end with the valve and a pressure-responsive member mounted in the end of the outer piston and connected with the other end of the lever, a valve positioned at the passage leading from the second chamber in the housing and the first chamber therein and being normally closed, and means responsive to a greater predetermined elevated pressure for opening the last mentioned valve to supply fluid under pressure through the last mentioned passage to the portion of the end of the outer piston contacting the end of the first chamber and to shift the outer piston for applying pressure through compression of the fluid locked in the chamber of the outer piston to maintain the part in its certain position.

5. The device specified in claim 4 and further comprising means for supplying pressure fluid to the other end of the inner piston and to the pressure-responsive member to shift the inner piston for moving the part from its certain position and to move the pressure-responsive member and thereby to open the valve at the passage in the outer piston for allowing fluid to pass out of the chamber in the outer piston.

6. A device for shifting a part to a certain position and for holding with force the part in the said certain position, said device comprising a housing having a first chamber of relatively large area extending from one end, a second chamber of relatively small area extending from the first chamber and a passage leading from the second chamber to the end of the first chamber, a first piston shiftable within the first chamber to and away from a position of contact of one end with the end of the first chamber, the end of the first piston being in the position of contact with the end of the first chamber exposed only the amount of the small area of the second chamber and in a position removed from contact exposed over its entire area, the first piston having a through passage, a second piston positioned on the side of the first piston away from the chambers and shiftable with respect to the first piston and connected with the part, means for forcing fluid under pressure into the second chamber against only the small area of the first piston, through the passage in the first piston, and into the first piston against one end of the second piston to shift the second piston to move the part to its certain position, a valve positioned at the passage in the first piston and being normally open, means responsive to a predetermined elevated pressure due to arrival of the part at its certain position for closing the aforesaid valve to lock fluid between the pistons, said means comprising a lever pivotally mounted between its ends on the end of the first piston and connected at one end with the valve and a pressure-responsive member mounted in the end of the first piston and connected with the other end of the lever, a valve positioned at the passage leading from the second chamber in the housing and the first chamber therein and being normally closed, and means responsive to a greater predetermined elevated pressure for opening the last mentioned valve to supply fluid under pressure through the last mentioned passage to the portion of the end of the first piston contacting the end of the first chamber and to shift the first piston for applying pressure through compression of the fluid locked between the pistons to maintain the part in its certain position.

7. The device specified in claim 6 and further comprising means for supplying pressure fluid to the other end of the second piston and to the pressure-responsive member to shift the second piston for moving the part from its certain position and to move the pressure-responsive member and thereby to open the valve at the passage in the first piston for allowing fluid to pass out from between the pistons.

8. A device for shifting a part to a certain position and for holding with force the part in the said certain position, said device comprising a housing having a first chamber of relatively large area extending from one end, a second chamber of relatively small area extending from the first chamber and a passage leading from the second chamber to the end of the first chamber, a piston shiftable within the first chamber to and away from a position of contact of one end with the end of the first chamber, the end of the piston being in the position of contact with the end of the first chamber exposed only the amount of the small area of the second chamber and in a position removed from contact exposed over its entire area, the piston having a through passage, means for forcing fluid under pressure into the second chamber against only the small area of the piston and through the passage in the piston to move the part to its certain position, a valve positioned at the passage in the piston and being normally open, means responsive to a predetermined elevated pressure due to arrival of the part at its certain position for closing the aforesaid valve to lock fluid between the piston and the part, said last mentioned means comprising a lever pivotally mounted between its ends on the end of the piston and connected at one end with the valve and a pressure-responsive member mounted in the end of the piston and connected with the other end of the lever, a valve positioned at the passage leading from the second chamber in the housing and the first chamber therein and being normally closed, and means responsive to a greater predetermined elevated pressure for opening the last mentioned valve to supply fluid under pressure through the last mentioned passage to the portion of the end of the piston contacting the end of the first chamber and to shift the piston for applying pressure through compression of the fluid locked between the piston and the part to maintain the part in its certain position.

9. The device specified in claim 8 and further comprising means for supplying fluid under pressure to the pressure-responsive member to shift the part from its certain position and to move the pressure-responsive member and thereby open the valve at the passage in the piston for allowing fluid to escape from between the piston and the part.

10. A device for shifting a part to a certain position and for holding with force the part in the said certain position, said device comprising a housing, a piston mounted within the housing and having a through passage, means for supplying fluid under pressure to the housing and through the passage in the piston to act against the said part and moving the part to its certain position, a valve positioned at the passage in the piston, a pressure-responsive member mounted in the end of the piston, means connecting the valve and the pressure-responsive member for causing movement of the pressure-responsive member due to a predetermined elevated pressure of the fluid in the housing due to arrival of the part at its certain position to close the valve and thereby to lock fluid between the piston and the part, means for thereafter causing a still greater pressure of the fluid to shift the piston for applying pressure to maintain the part in its predetermined position, and means for thereafter supplying fluid under pressure to the pressure-responsive member to move the pressure-responsive member and thereby open the valve at the passage in the piston for allowing fluid to escape through the passage in the piston.

11. The device specified in claim 10, the means connecting the pressure-responsive member and the valve at the passage in the piston comprising a lever pivoted between its ends on the piston and having its ends connected to the valve and the pressure-responsive member.

12. The device specified in claim 10, the means connecting the pressure-responsive member and the valve at the passage in the piston comprising a lever pivoted between its ends on the piston and having its ends connected to the valve and the pressure-responsive member, the pivot of the lever on the piston being shiftable against resilient means away from a position normally determining with the pressure-responsive member closed position of the valve and thereby permitting slight movement of the valve from its closed position for leakage of fluid through the passage in the piston.

13. A device for shifting a part to a certain position and for holding with force the part in the said certain position, said device comprising a housing, a first piston mounted within the housing and having a through passage, a second piston positioned between the part and the first piston, means for supplying fluid under pressure to the housing and through the passage in the first piston to act against the said one end of the second piston for shifting the same and moving the part to its certain position, a valve positioned at the passage in the first piston, a pressure-responsive member mounted in the end of the first piston, means connecting the valve and the pressure-responsive member for causing movement of the pressure-responsive member due to a predetermined elevated pressure of the fluid in the housing due to arrival of the part at its certain position to close the valve and thereby to lock fluid between the pistons, means for thereafter causing a still greater pressure of the fluid to shift the first piston for applying pressure to the said one end of the second piston through compression of the fluid locked between the pistons to maintain the part in its predetermined position, and means for thereafter supplying fluid under pressure to the other end of the first piston and to the pressure-responsive member to shift the second piston for moving the part from the certain position to move the pressure-responsive member and thereby open the valve at the passage in the first piston for allowing fluid to escape through the passage to the first piston.

14. The device specified in claim 13, the means connecting the pressure-responsive member and the valve at the passage in the first piston comprising a lever pivoted between its ends on the first piston and having its ends connected to the valve and the pressure-responsive member.

15. The device specified in claim 13, the means connecting the pressure-responsive member and the valve at the passage in the first piston comprising a lever pivoted between its ends on the first piston and having its ends connected to the valve and the pressure-responsive member, the pivot of the lever on the first piston being shiftable against resilient means away from a position normally determining with the pressure-responsive member closed position of the valve and thereby permitting slight movement of the valve from its closed position for leakage of fluid through the passage in the passage in the first piston.

WALTER P. COUSINO.

REFERENCES CITED

The following references are of record in the file of this patent:

UNITED STATES PATENTS

| Number | Name | Date |
| --- | --- | --- |
| 1,845,232 | Brandenburg | Feb. 16, 1932 |
| 1,865,105 | Houplain | June 28, 1932 |
| 1,970,999 | Ferris | Aug. 21, 1934 |
| 2,251,293 | Schwartz | Aug. 5, 1941 |
| 2,268,026 | Ernst et al. | Dec. 30, 1941 |
| 2,272,360 | Swift | Feb. 10, 1942 |
| 2,273,713 | Lawyer | Feb. 17, 1942 |
| 2,282,556 | Bowen | May 12, 1942 |
| 2,284,228 | Page | May 26, 1942 |
| 2,335,917 | Cuthbert | Dec. 7, 1943 |
| 2,381,930 | Schnell | Aug. 14, 1945 |